US012013095B2

(12) United States Patent
Hölzl et al.

(10) Patent No.: US 12,013,095 B2
(45) Date of Patent: Jun. 18, 2024

(54) LIGHTING DEVICE FOR VEHICLE HEADLAMP

(71) Applicant: ZKW Group GmbH, Wieselburg (AT)

(72) Inventors: Andreas Hölzl, Wieselburg (AT); Christian Knobloch, Persenbeug-Gottsdorf (AT); Stefan Mitterlehner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/377,879

(22) Filed: Oct. 9, 2023

(65) Prior Publication Data

US 2024/0125446 A1 Apr. 18, 2024

(30) Foreign Application Priority Data

Oct. 12, 2022 (EP) .................................... 22201107

(51) Int. Cl.

| | |
|---|---|
| ***F21S 41/365*** | (2018.01) |
| ***F21S 41/20*** | (2018.01) |
| ***F21S 41/29*** | (2018.01) |
| ***F21S 41/675*** | (2018.01) |

(52) U.S. Cl.

CPC ........... *F21S 41/365* (2018.01); *F21S 41/285* (2018.01); *F21S 41/295* (2018.01); *F21S 41/675* (2018.01)

(58) Field of Classification Search

CPC ...... F21S 41/365; F21S 41/675; F21S 41/295; F21S 41/285

See application file for complete search history.

(56) References Cited

U.S. PATENT DOCUMENTS

| | | | | |
|---|---|---|---|---|
| 5,414,601 A * | 5/1995 | Davenport | .............. | F21S 41/43 362/293 |
| 8,602,618 B2 * | 12/2013 | Ahn | ........................ | F21S 41/25 362/465 |
| 2019/0145600 A1 | 5/2019 | Spinger et al. | | |

FOREIGN PATENT DOCUMENTS

| | | |
|---|---|---|
| JP | 2005071731 A | 3/2005 |
| WO | 9854611 A2 | 12/1998 |

OTHER PUBLICATIONS

"DLP System Optics—Application Report", Texas Instruments, Sep. 3, 2013, Retrieved from http://www.ti.com/lit/an/dlpa022/dlpa022.pdf.

Extended European Search Report for European Patent Application No. 22201107.4 dated Mar. 1, 2023 (10 Pages).

Kauschke et al. "Systematik zur lichttechnischen Gestaltung von akti-ven Scheinwerfern," Dissertation, Jan. 1, 2007, Retrieved from https://digital.ub.uni-paderborn.de/ubpb/urn/urn:nbn:de:hbz:466-20007091910.

* cited by examiner

*Primary Examiner* — Matthew J. Peerce

(74) *Attorney, Agent, or Firm* — Eversheds Sutherland (US) LLP

(57) ABSTRACT

A lighting device (1) for a vehicle headlamp is provided. The lighting device includes an illuminant (2), a collimator (4), a mirror device (5) with a reflection surface (**5*a*), and a DMD device (6). The mirror device (5) is arranged downstream of the collimator (4), wherein the reflection surface (5*a*) of the mirror device (5) is configured to reflect a first part of the light from the illuminant and to transmit a second part of the light from the illuminant. The mirror device (5) is configured in such a way that the reflected part is free of UV light and the transmitted part has UV light. The DMD device (6**) is configured to modulate and deflect the first part of the light from the illuminant.

20 Claims, 1 Drawing Sheet

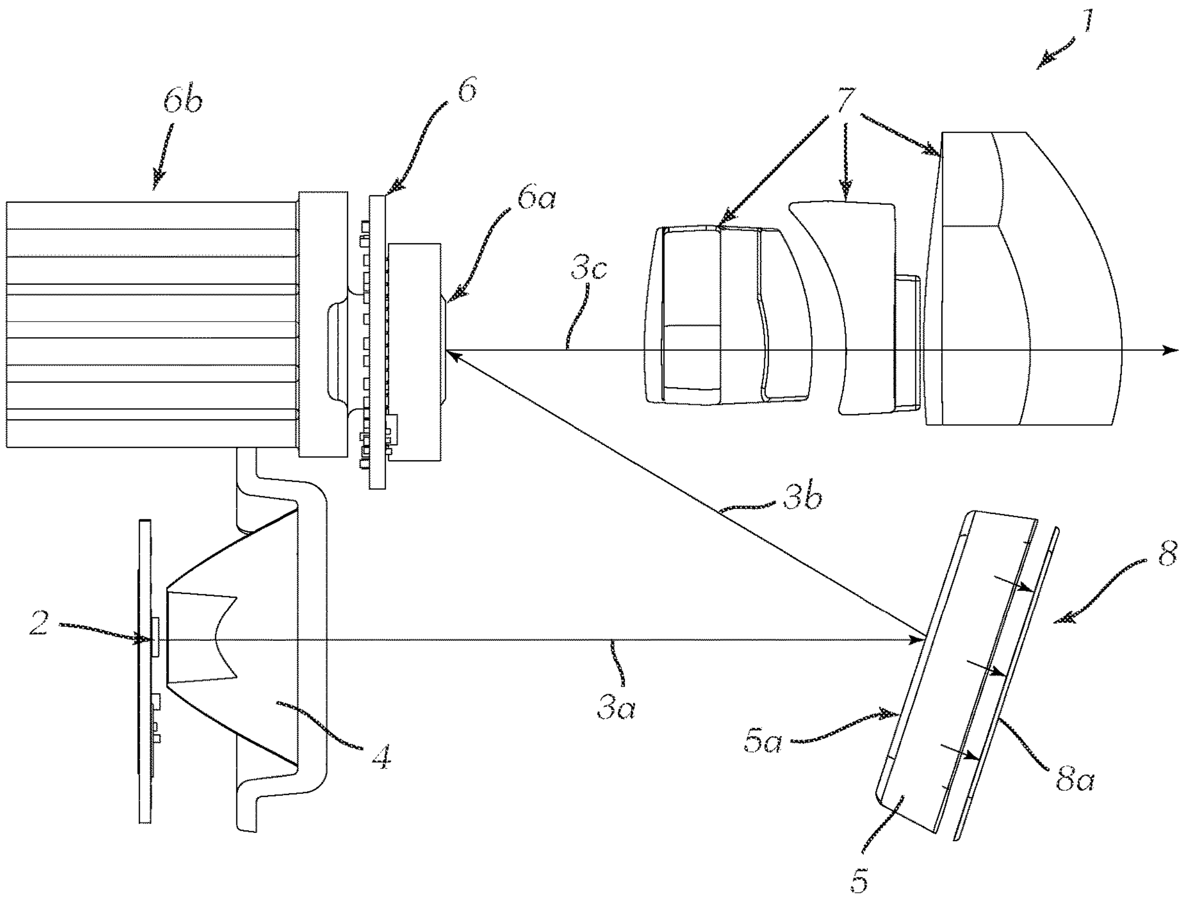
1
6b
6
7
6a
3c
3b
8
2
3a
5a
4
8a
5

LIGHTING DEVICE FOR VEHICLE HEADLAMP

CROSS-REFERENCE TO RELATED APPLICATIONS

This application claims priority to European Patent Application No. 22201107.4, filed Oct. 12, 2022, which is incorporated herein by reference.

FIELD OF THE INVENTION AND DESCRIPTION OF PRIOR ART

The invention relates to a lighting device for a vehicle headlamp, wherein the lighting device comprises the following: an illuminant for producing and emitting light, and a collimator, which is arranged downstream of the illuminant and is configured to form light from the illuminant into a first light beam such that the first light beam exits the collimator along a first beam direction. The invention further relates to a vehicle headlamp comprising a lighting device.

Lighting devices for (motor) vehicle headlamps are known in the prior art. High-resolution lighting devices often use DMD (Digital Micromirror Device) modules that redirect a light image, for example onto a projection medium, to achieve a specific lighting function. Light that forms the light image deflected by the DMD module is usually initially produced by a light source and then formed into the desired light image by optical devices before it strikes the DMD module. As it is necessary when using DMD modules to protect them from UV light, the optical devices that form the light image usually have UV filters. Optical devices of this kind are usually a group of at least two, often also three or more, lenses, wherein at least one of these lenses has a UV-absorbing coating.

Disadvantageously, these coatings often do not sufficiently reduce the UV component of the light. Moreover, the use of a plurality of lenses, at least one of which must be coated, has the disadvantage that a large number of essential (optical) components is needed. Another disadvantage of the known systems is that in order to be coatable, the lenses have to be made from a solid or resistant material, which makes them heavy.

SUMMARY OF THE INVENTION

The object of the present invention consists in mitigating or eliminating the disadvantages of the prior art. The object of the invention is therefore in particular to provide a lighting device that improves the reduction of undesired UV light and at the same time reduces the complexity of the device.

This object is achieved by a lighting device having the features of Claim 1. Preferred embodiments are specified in the dependent claims.

According to the invention, the lighting device comprises:

a mirror device with a reflection surface, wherein the mirror device is arranged along the first beam direction downstream of the collimator, wherein the reflection surface of the mirror device is configured to reflect a first part of the first light beam and to transmit a second part of the first light beam, wherein the mirror device is configured in such a way that the reflected part of the first light beam is substantially free of UV light and the transmitted part of the first light beam has UV light, wherein the mirror device is further configured to reflect the first part of the first light beam in such a way that the reflected part of the first light beam forms a second light beam, which spreads along a second beam direction that is different from the first beam direction, and a DMD device, which has a deflection surface, which is formed by a plurality of micromirrors configured to modulate and deflect the second light beam, wherein the DMD device is arranged along the second beam direction downstream of the mirror device in such a way that the second light beam strikes the deflection surface of the DMD device, wherein the second light beam deflected by the deflection surface of the DMD module forms a third light beam, which spreads along a third beam direction that is different from the second beam direction.

This has the advantage that the DMD device remains substantially free of UV light, as only light (the reflected part of the first light beam) with a wavelength greater than the wavelength of UV light is deflected or reflected in the direction of the DMD device by the mirror device. Another advantage is that instead of a plurality of lenses, the light image is formed by a single collimator. A plurality of lenses, some of which are coated, can thus be dispensed with. UV light is understood as light with a wavelength of substantially 380 nm to 110 nm. In particular, only the reflected part of the first light beam strikes the DMD device. The reflected part of the first light beam is preferably free of UV light, wherein in particular all of the UV component of the light from the illuminant is in the transmitted part of the first light beam.

It can be provided that the lighting device further comprises a projection device, which is arranged along the third beam direction downstream of the DMD device in such a way that the third light beam strikes the projection device, wherein the projection device is configured to project the third light beam into a traffic area. The light beam projected into the traffic area can in particular form a lighting function. The first light beam, the second light beam and the third light beam are in particular formed from the light from the illuminant, which spreads in different directions within the lighting device starting from the illuminant until it is projected into a traffic area.

It can be provided that the reflection surface of the mirror device is configured to form the second light beam from the first light beam in such a way that the second light beam forms a, preferably projectable, light image for at least one light distribution. The light image for the at least one light distribution can preferably be formed by an optical interaction of the collimator and the mirror device. The collimator, the mirror device and preferably the DMD device are in particular the optically active elements of the lighting device. An element is optically active within the meaning of this disclosure if it changes the direction of the light passing through the element or striking a surface of the element during intended use with respect to its direction and/or its beam characteristics.

It can be provided that the reflection surface of the mirror device is curved to form the light image, wherein the reflection surface is preferably curved towards the collimator, in particular concave.

It can be provided that the micromirrors of the DMD device comprise tiltable reflective surface elements, in particular micromirrors, wherein the light image can be modulated by tilting the reflective surface elements. Individual areas of the light image can, for example, be hidden by modulating the light image. This makes it possible, for example, to produce adaptive dipped beam distribution.

It can be provided that the projection device is configured to project the light image in the form of light distribution.

It can be provided that the light distribution comprises a dipped beam distribution, in particular an adaptive one, or a full beam distribution.

It can be provided that the lighting device has an absorption means, which is arranged on a rear side of the mirror device facing away from the reflection surface of the mirror device and is configured to absorb UV light transmitted by the reflection surface, wherein the absorption means preferably has a screen configured to absorb UV light. This results in the advantage that the reflected part of the first light beam is free of UV light and in particular substantially all of the UV light of the illuminant (or the UV light component of the light from the illuminant) is transmitted through the mirror device and absorbed by the absorption means.

It can be provided that the mirror device is configured as an interference mirror, in particular as a dichroic deflection mirror.

It can be provided that the collimator, the mirror device and the DMD device are arranged in relation to one another in such a way that the first beam direction runs substantially parallel to the third beam direction.

It can be provided that the collimator and the mirror device are arranged in relation to one another in such a way that the first beam direction and the second beam direction form an acute angle. The angle is in particular smaller than 90°, preferably between 200 and 70°. As a result, the lighting device can be configured to be particularly compact or space-saving.

It can be provided that the mirror device and the DMD device are arranged in relation to one another in such a way that the second beam direction and the third beam direction form an acute angle. The angle is in particular smaller than 90°, preferably between 200 and 70°. As a result, the lighting device can be configured to be particularly compact or space-saving.

It can be provided that the collimator is formed from an optical polymer, in particular from silicone, wherein the collimator is preferably configured as a compound parabolic concentrator collimator. This results in the advantage that the collimator has a smaller weight compared to the coated lenses used in the prior art as the lenses have to be made of glass in order to be coatable. The collimator can in particular be free of a UV coating (as such a coating is not expedient for polymers, in particular for silicone) as the UV light component of the light from the illuminant is substantially filtered (or transmitted) by the mirror device. A compound parabolic concentrator collimator comprises in particular a central converging lens and a totally reflecting side region.

It can be provided that the mirror device is configured such that substantially all of the UV light of the first light beam is transmitted through the mirror device.

According to the invention, a vehicle headlamp is provided, which comprises a lighting device according to the invention.

In the context of this description, the terms “above”, “below”, “horizontal”, “vertical” should be understood as indications of orientation when the lighting device is arranged in its normal position of use after having been fitted to a vehicle headlamp.

BRIEF DESCRIPTION OF THE FIGURES

The invention is outlined in more detail below based on a preferred exemplary embodiment, to which it is, however, not limited: In the drawings:

FIG. 1 shows a schematic side view of an exemplary embodiment of a lighting device according to the invention.

DETAILED DESCRIPTION OF EMBODIMENTS OF THE INVENTION

FIG. 1 shows an exemplary embodiment of a lighting device 1 according to the invention for a vehicle headlamp. The lighting device 1 comprises an illuminant 2 for producing and emitting light and a collimator 4. The collimator 4 is arranged downstream of the illuminant 2 and is configured to form light from the illuminant 2 into a first light beam. The first light beam exits the collimator 4 along a first beam direction 3*a*.

The lighting device 1 further comprises a mirror device 5 with a reflection surface 5*a*. The mirror device 5 is arranged along the first beam direction 3*a* downstream of the collimator 4. The reflection surface 5*a* of the mirror device 5 is configured to reflect a first part of the first light beam and to transmit a second part of the first light beam. The mirror device 5 is configured in such a way that the reflected part of the first light beam is free of UV light and the transmitted part of the first light beam has UV light. The mirror device 5 is further configured to reflect the first part of the first light beam in such a way that the reflected part of the first light beam forms a second light beam. The second light beam spreads along a second beam direction 3*b* that is different from the first beam direction 3*a*, i.e. in the direction of a DMD device 6.

In the exemplary embodiment shown, the mirror device 5 is configured as a dichroic deflection mirror. The reflection surface 5*a* of the mirror device 5 or of the dichroic deflection mirror is curved to form the light image. In the exemplary embodiment shown, the reflection surface 5*a* is curved or concave towards the collimator 4. The reflection surface 5*a* of the mirror device 5 is configured to form the second light beam from the first light beam in such a way that the second light beam forms a, preferably projectable, light image for light distribution. The mirror device 5 is configured such that substantially all of the UV light of the first light beam is transmitted through the mirror device.

The DMD device 6 comprises a deflection surface 6*a*, which is formed by a plurality of micromirrors configured to modulate and deflect the second light beam. On a side facing away from the deflection surface 6*a*, the DMD device 6 has a cooling element 6*b* configured to cool the DMD device 6. The DMD device 6 is arranged along the second beam direction 3*b* downstream of the mirror device 5 in such a way that the second light beam strikes the deflection surface 6*a* of the DMD device 6. The second light beam deflected by the deflection surface 6*a* of the DMD module 6 forms a third light beam, which spreads along a third beam direction 3*c* that is different from the second beam direction 3*b*. In FIG. 1, no rays of light are shown for a better overview; the rays of light (not shown) or the light beams formed from the rays of light spread substantially parallel to or along the beam directions 3*a*, 3*b* and 3*c*.

In the exemplary embodiment shown, the micromirrors of the DMD device 6 are tiltable reflective surface elements, wherein the light image can be modulated by tilting the reflective surface elements.

In the exemplary embodiment shown, the lighting device further comprises a projection device 7, which is arranged along the third beam direction 3*c* downstream of the DMD device 6 in such a way that the third light beam strikes the projection device 7. The projection device 7 is configured to project the third light beam into a traffic area. The projection device 7 is preferably configured to project the light image in the form of light distribution. The light distribution can be a dipped beam distribution, in particular an adaptive one, or a full beam distribution. In the exemplary embodiment shown, the projection device 7 comprises a lens system, which has three lenses.

The lighting device 1 can further have an absorption means 8, which is arranged on a rear side of the mirror device 5 facing away from the reflection surface 5*a* of the mirror device 5. The absorption means 8 is configured to absorb UV light transmitted by the reflection surface 5*a*, wherein the absorption means 8 has a screen 8*a* configured to absorb UV light in the exemplary embodiment shown.

In the exemplary embodiment shown, the collimator 4, the mirror device 5 and the DMD device 6 are arranged in relation to one another in such a way that the first beam direction 3*a* runs substantially parallel to the third beam direction 3*c*. Furthermore, the collimator 4 and the mirror device 5 are arranged in relation to one another in such a way that the first beam direction 3*a* and the second beam direction 3*b* form an acute angle. The mirror device 5 and the DMD device 6 are in turn arranged in relation to one another in such a way that the second beam direction 3*b* and the third beam direction 3*c* form an acute angle.

In the exemplary embodiment shown, the collimator is formed from an optical polymer, in particular from silicone. The collimator is preferably configured as a compound parabolic concentrator collimator.

The invention claimed is:

1. A lighting device (1) for a vehicle headlamp, the lighting device (1) comprising:

an illuminant (2) for producing and emitting light;

a collimator (4), which is arranged downstream of the illuminant (2) and is configured to form light from the illuminant (2) into a first light beam such that the first light beam exits the collimator (4) along a first beam direction (3*a*);

a mirror device (5) with a reflection surface (5*a*), wherein the mirror device (5) is arranged along the first beam direction (3*a*) downstream of the collimator (4), wherein the reflection surface (5*a*) of the mirror device (5) is configured to reflect a first part of the first light beam and to transmit a second part of the first light beam, wherein the mirror device (5) is configured in such a way that the reflected part of the first light beam is substantially free of UV light and the transmitted part of the first light beam has UV light, wherein the mirror device (5) is further configured to reflect the first part of the first light beam in such a way that the reflected part of the first light beam forms a second light beam, which spreads along a second beam direction (3*b*) that is different from the first beam direction (3*a*); and a DMD device (6), which has a deflection surface (6*a*), which is formed by a plurality of micromirrors configured to modulate and deflect the second light beam, wherein the DMD device (6) is arranged along the second beam direction (3*b*) downstream of the mirror device (5) in such a way that the second light beam strikes the deflection surface (6*a*) of the DMD device (6), wherein the second light beam deflected by the deflection surface (6*a*) of the DMD module (6) forms a third light beam, which spreads along a third beam direction (3*c*) that is different from the second beam direction (3*b*).

2. The lighting device (1) according to claim 1, further comprising a projection device (7), which is arranged along the third beam direction (3*c*) downstream of the DMD device (6) in such a way that the third light beam strikes the projection device (7), wherein the projection device (7) is configured to project the third light beam into a traffic area.

3. The lighting device (1) according to claim 1, wherein the reflection surface (5*a*) of the mirror device (5) is configured to form the second light beam from the first light beam in such a way that the second light beam forms a light image for light distribution.

4. The lighting device (1) according to claim 3, wherein the reflection surface (5*a*) of the mirror device (5) is curved to form the light image, wherein the reflection surface (5*a*) is curved towards the collimator (4).

5. The lighting device (1) according to claim 3, wherein the micromirrors of the DMD device (6) comprise tiltable reflective surface elements, wherein the light image can be modulated by tilting the reflective surface elements.

6. The lighting device (1) according to claim 3, wherein the projection device (7) is configured to project the light image in the form of a light distribution.

7. The lighting device (1) according to claim 6, wherein the light distribution comprises a dipped beam distribution or a full beam distribution.

8. The lighting device (1) according to claim 1, wherein the lighting device (1) has an absorption means (8), which is arranged on a rear side of the mirror device (5) facing away from the reflection surface (5*a*) of the mirror device (5) and is configured to absorb UV light transmitted by the reflection surface (5*a*).

9. The lighting device (1) according to claim 1, wherein the mirror device (5) is configured as an interference mirror, in particular as a dichroic deflection mirror.

10. The lighting device (1) according to claim 1, wherein the collimator (4), the mirror device (5) and the DMD device (6) are arranged in relation to one another in such a way that the first beam direction (3*a*) runs substantially parallel to the third beam direction (3*c*).

11. The lighting device (1) according to claim 1, wherein the collimator (4) and the mirror device (5) are arranged in relation to one another in such a way that the first beam direction (3*a*) and the second beam direction (3*b*) form an acute angle.

12. The lighting device (1) according to claim 1, wherein the mirror device (5) and the DMD device (6) are arranged in relation to one another in such a way that the second beam direction (3*b*) and the third beam direction (3*c*) form an acute angle.

13. The lighting device (1) according to claim 1, wherein the collimator is formed from a silicone or other optical polymer.

14. The lighting device (1) according to claim 1, wherein the mirror device (5) is configured such that substantially all of the UV light of the first light beam is transmitted through the mirror device (5).

15. A vehicle headlamp comprising the lighting device (1) according to claim 1.

16. The lighting device (1) according to claim 3, wherein the light image is projectable.

17. The lighting device (1) according to claim 4, wherein the reflection surface (5*a*) is concave.

18. The lighting device (1) according to claim 8, wherein the absorption means (8) has a screen (8*a*) configured to absorb UV light.

19. The lighting device (1) according to claim 13, wherein the collimator is configured as a compound parabolic concentrator collimator.

20. The lighting device (1) according to claim 7, wherein the dipped beam distribution is an adaptive dipped beam distribution.

* * * * *